Dec. 3, 1935.  R. E. GREY ET AL  2,022,663
SPEED TRANSMISSION
Filed Oct. 26, 1932  4 Sheets-Sheet 1
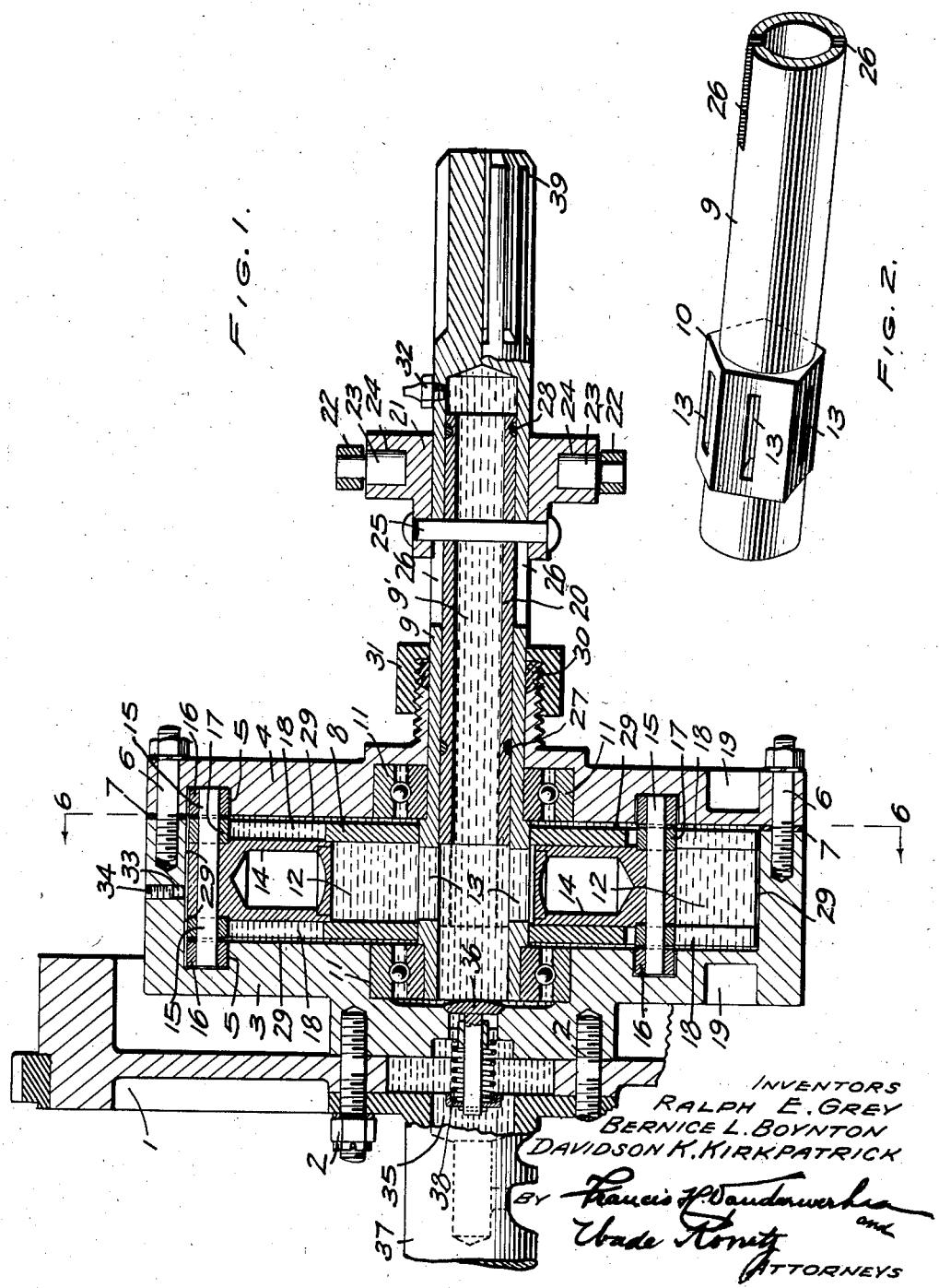
INVENTORS
RALPH E. GREY
BERNICE L. BOYNTON
DAVIDSON K. KIRKPATRICK
ATTORNEYS

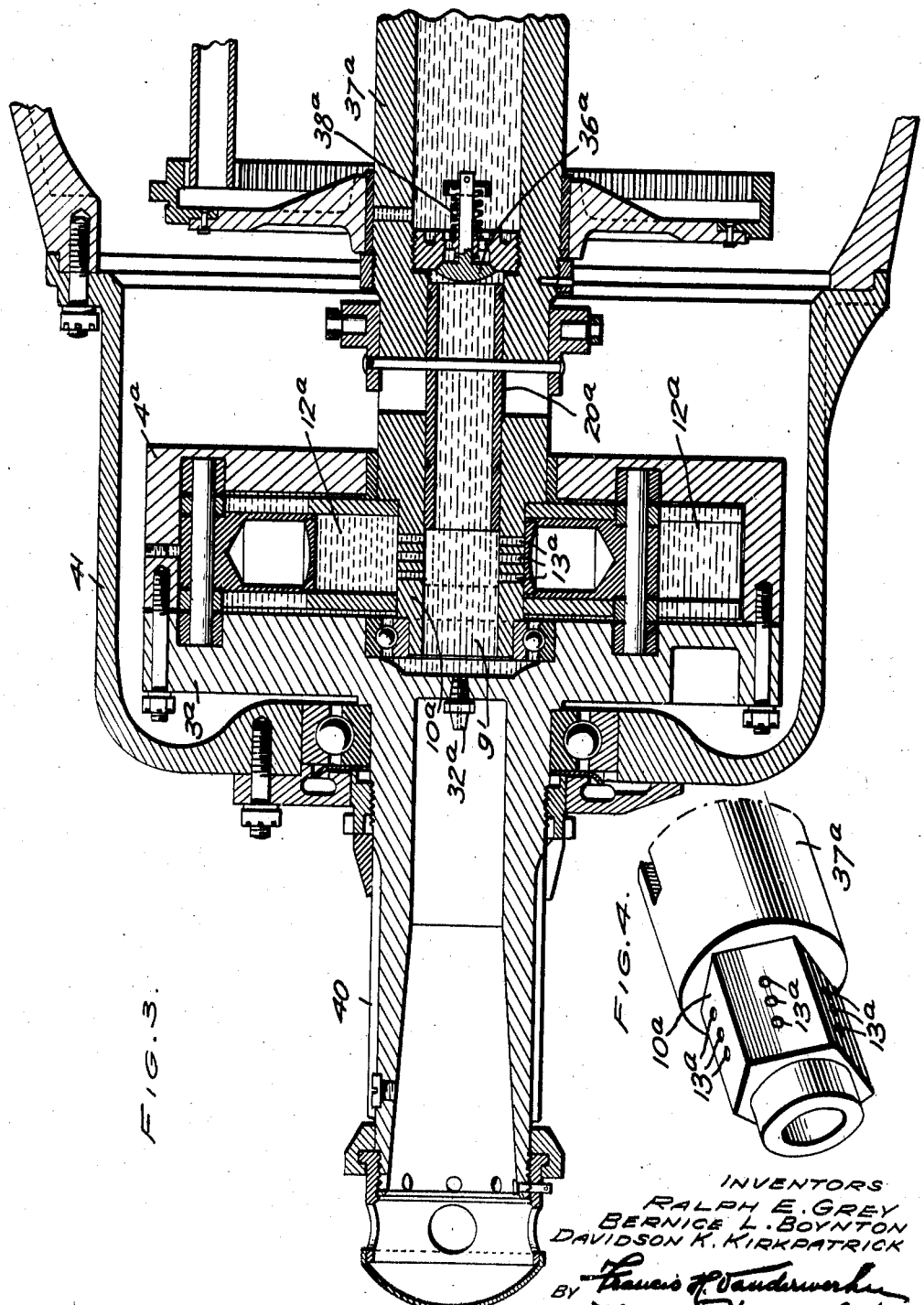

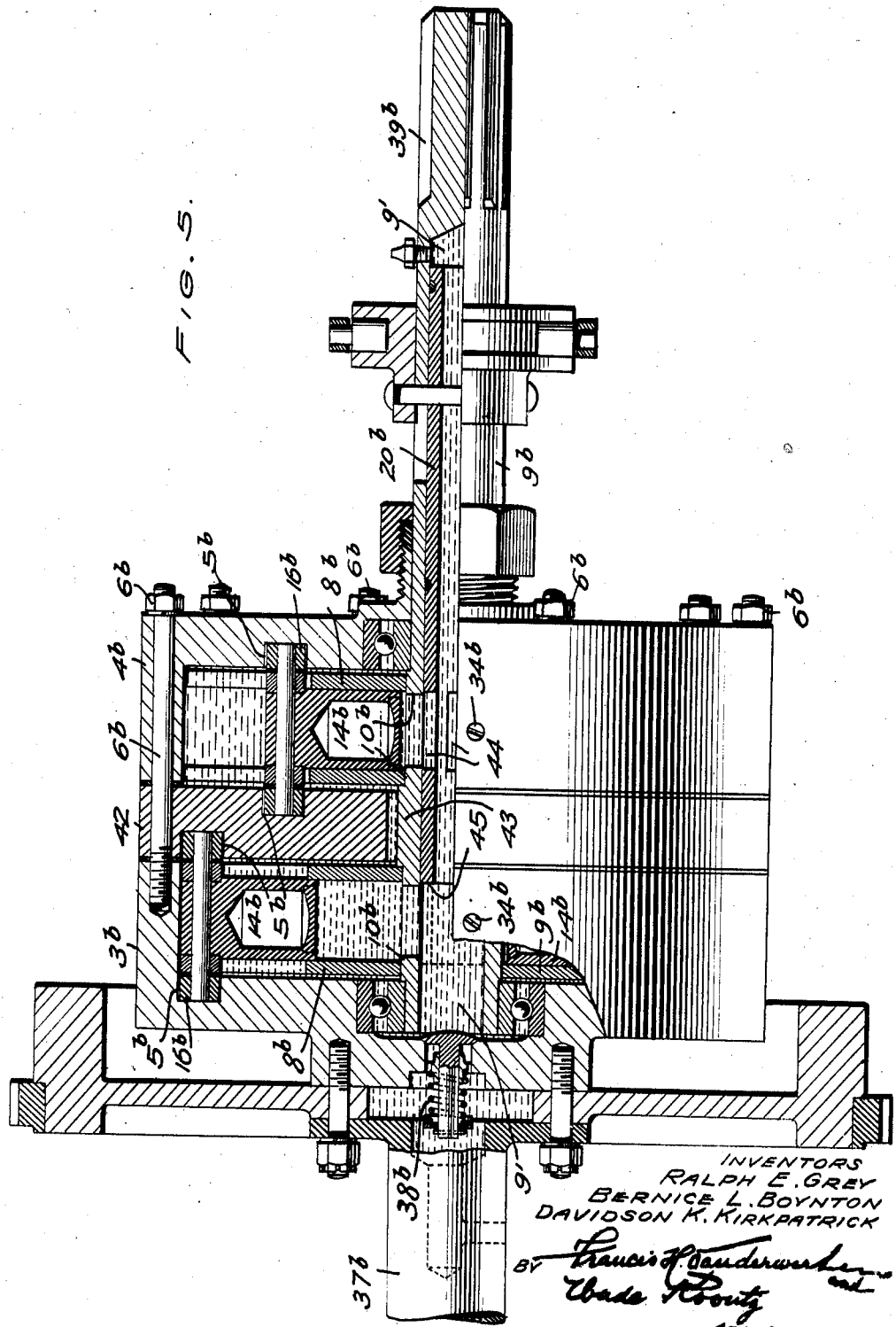

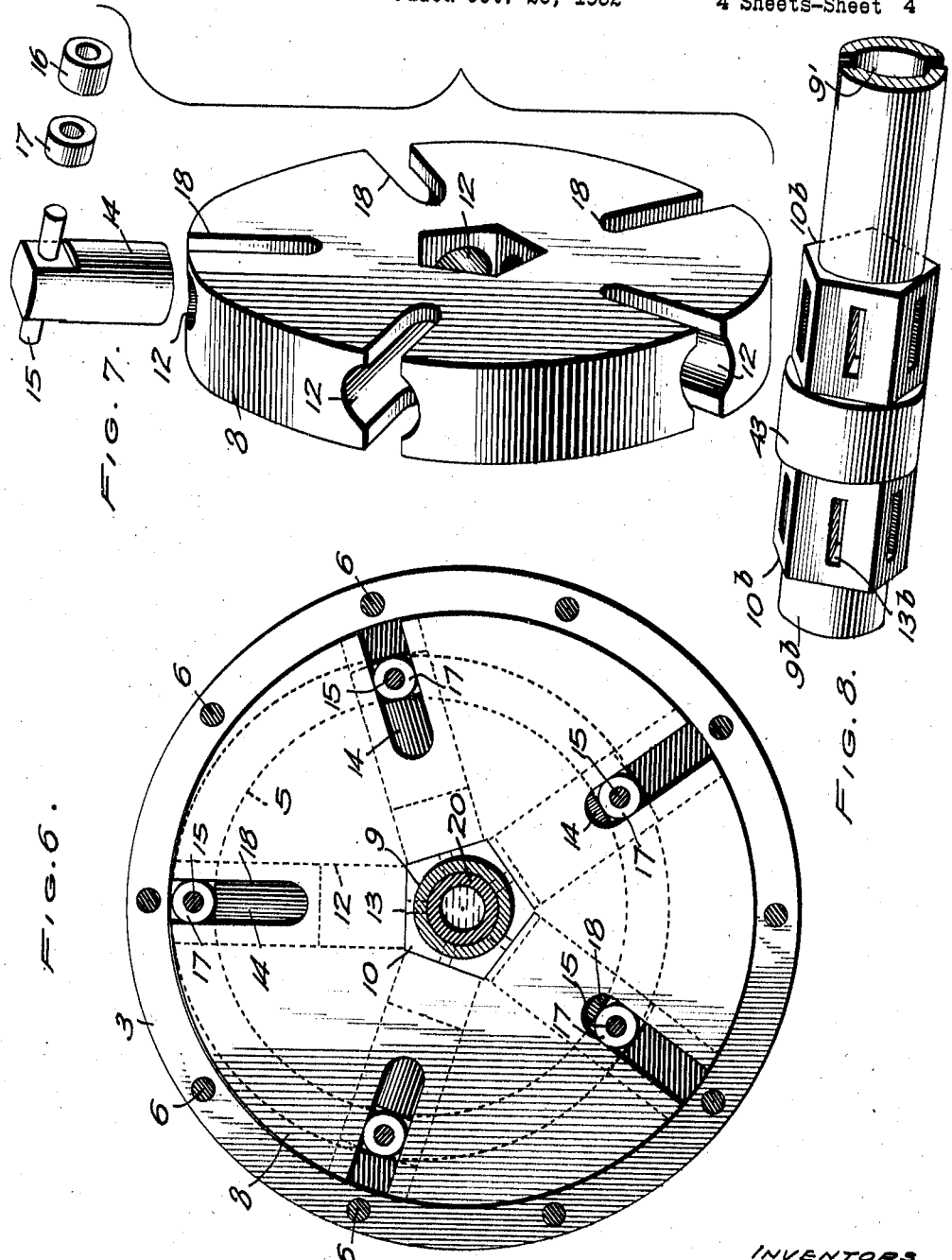

Patented Dec. 3, 1935

2,022,663

UNITED STATES PATENT OFFICE 2,022,663

SPEED TRANSMISSION

Ralph E. Grey, Bernice L. Boynton, and Davidson K. Kirkpatrick, Langley Field, Hampton, Va.

Application October 26, 1932, Serial No. 639,674

6 Claims. (Cl. 192—60)

(Granted under the act of March 3, 1883, as amended April 30, 1928; 370 O. G. 757)

The invention described herein may be manufactured and used by or for the Government for governmental purposes, without the payment to us of any royalty thereon.

This invention relates generally to power transmitting devices, and refers more particularly to devices of this nature which are controlled by hydraulic pressure.

In any type of hydraulically operated device, any leakage of liquid, unless it is forced out by additional liquid being added will allow a certain amount of air or partial vacuum to be formed within the assembly. This air or vacuum, being compressible, will allow the driving and driven element to "slip" in their relation to each other, thereby causing a serious loss of efficiency. Valves for controlling the flow of liquid also present a serious difficulty and must be so constructed that their movement within the assembly will not displace their equivalent in liquid; this also applies to valve control rods. In hydraulic devices of this nature, this displacement of liquid by the valves or valve control rods has been one of the main disadvantages. A further difficulty has been the necessity of designing a unit that would not leak. This appears to be an impossibility, especially for an extended length of time as would be required in any practical installation of the device on modern machines or vehicles. Realizing the impracticability of designing a leak-proof unit of this nature we have overcome this difficulty by providing means whereby any loss of liquid from the device is automatically replenished either from the oil supply of the engine unit or from an outside source of pressure.

It is the purpose of the present invention, therefore, to provide a transmission device in which these difficulties are overcome, thereby creating a device that may be operated under any conditions.

The principal object in view is to provide a transmission device suitable for use in automobile and aircraft propulsion. In aircraft propulsion there is great need for variable speed transmission between engine and propeller, and in automobile propulsion the conventional clutch and transmission, with their many moving parts present a serious problem to engineers both in their initial cost and in later maintenance cost.

A further object is to provide a transmission which is adaptable for use in aircraft to make direct connection between the engine and propeller during appropriate flight conditions and to change the ratio of propeller speed to engine speed when required.

A further object is to provide a transmission for use in movable craft such as automobiles, aircraft, trucks, tractors, tanks, and boats, which permits changing speed without the operation of the usual large number of movable parts, with consequent wear and disarrangement.

A still further object is to provide a suitable connection between driving or driven shafts or elements on any type of machine or mechanical unit, such as steam shovels, hoists, cranes, machine tools or any other type of machine using any type of clutch or transmission.

Other objects and advantages of the proposed transmission over known devices of this nature will appear as the following specification is read in connection with the accompanying drawings, in which:

Figure 1 is a longitudinal sectional view of a single unit transmission device adapted for use with an automobile;

Figure 2 is a detail perspective view of a portion of a single unit rotor shaft;

Figure 3 is a longitudinal sectional view of a single unit transmission device applied to an aircraft engine;

Figure 4 is a detail view of the rotor shaft used with the aircraft engine unit, showing the metered ports or oil passages;

Figure 5 is a longitudinal sectional view of a two unit device applied to an automobile engine;

Figure 6 is a cross section on line 6—6 of Figure 1;

Figure 7 is a composite view of a rotor assembly, and

Figure 8 is a detail perspective view of the rotor shaft used in the two unit device.

The broad terms "driving element" and "driven element" are used herein to mean the corresponding elements of any machinery which is susceptible of being coupled together by the transmission drive.

Referring more particularly to the structure illustrated in Figure 1, the numeral 1 designates the fly wheel of an automobile engine to which is connected, by means of studs 2, the driving element of the transmission, which driving element is composed of housings 3 and 4 provided on their inner surfaces with eccentric tracks 5. These housings are held together by studs 6, and a suitable positioning dowel which is not shown. Gaskets 7 prevent any leakage of liquid at the joints between the housings 3 and 4. These gaskets may be eliminated by having ground joints suitably recessed at this point. If desired, the driving element could be made of such size and weight as to replace the conventional fly wheel. Numeral 8 designates the rotor of the driven element which is suitably fixed on a hollow shaft 9, preferably being pressed on pentagon shaped portion 10 of said shaft. The driven element is concentrically arranged within the driving element with the rotor shaft 9 mounted in bearings 11 in axial alignment with the driving element and the rotor 8 is formed with a plurality of cylinders 12, in the present case five, disposed radially on the axis of rotation thereof and equally spaced. The cylinders 12 have communication with the hollow interior of the rotor shaft 9 through slots or openings 13 in the pentagon shaped portion 10 of the shaft, the hollow interior being an oil filled space or reservoir 9'.

Within each cylinder 12 is a piston 14 supported at its outer end upon an axle 15 mounted in suitable rollers 16 and 17. Rollers 16 travel in the eccentric tracks 5 of the driving member and rollers 17 travel in guide slots 18 formed in the walls of the rotor 8. The pistons 14 are reciprocally actuated within the cylinders 12 during relative motion of the driving and driven members by the action of the eccentric tracks 5 in which the rollers 16 are guided. In a single rotor device, balancing is accomplished by machining the heavy side of each housing 3 and 4, as shown at 19. This is done in order to compensate for the eccentric tracks 5 which are machined in the housings 3 and 4. To maintain perfect balance of the rotor 8, the pistons 14 complete with axles 15 and rollers 16 and 17 are made the same weight as the amount of liquid that is displaced by the total assembly, i. e., pistons, axles, and rollers. This can be accomplished by making the pistons of one of the many light alloys now available or by making them hollow as shown, or both.

A hollow control valve 20, open at each end, is mounted within the rotor shaft 9 for controlling the passage of liquid through the ports 13. While other types of valves, such as a rotary valve, could be used, a slide valve of the type illustrated is preferred. This slide valve 20, by reason of its open axial bore provides a through passage for the liquid from one end of the valve to the other so that the volume of liquid displaced at the advancing end of the valve, during its actuation, is taken care of in the resultant space left at the receding end of the valve. The slide valve is actuated by suitable manual control, including a collar 21 and yoke 22; the yoke being connected to the collar by trunnions 23 fitting in sockets 24 in the collar, and the collar having a slide bearing on the rotor shaft 9 and being connected to the slide valve by a pin 25 which is free to slide in slots 26 of the shaft. Leakage of liquid into the slotted portion of the shaft 9 is prevented by the packing rings 27 and 28 of the slide valve. With the slide valve 20 in the neutral position, as shown in full lines in the several figures, the slots 13 are entirely uncovered and provide ports whereby the liquid contained in the cylinders 12 is allowed to pass to the interior of the assembly through the hollow shaft 9. Suitable clearance is provided between the driving and driven members, as shown at 29, whereby liquid may be freely circulated within the assembly and the latter is further made leakproof by a packing 30 and a packing nut 31.

Before the device is placed in operation all air inside of it is displaced by forcing liquid, usually oil, into the same through a self-closing valve 32 located, as shown, in the rotor shaft 9. Oil is forced into the unit until all air is dispelled through air bleed holes 33, which are then closed by means of screw plugs 34. After this initial filling with oil no further attention is required as all leakage is automatically replenished from the oil pressure supply of the engine through the engine shaft oil chamber 35 controlled by a spring loaded check valve 36. The oil within the chamber 35 of the engine shaft 37 is maintained under pressure by the conventional engine oil pressure pump of the engine lubrication system. When the pressure within the transmission unit falls below the pressure within chamber 35, due to leakage or any other loss of liquid that may occur in operation, the valve 36 opens and permits oil from chamber 35 to pass into the transmission unit to replenish the oil supply thereof. Valve 36 is normally held closed by spring 38 thereby preventing leakage of oil from the transmission to the engine oil supply when the engine is not running. The end of driven shaft 9 is connected by suitable means, such as splines 39, to a reverse mechanism. This reverse could be mounted in a separate case or in the same case with the transmission device.

The single unit transmission device used in an aircraft engine, as shown in Figure 3, is of the same general description as outlined under Figure 1, with the following modifications. In this case the driving and driven elements are reversed from the positions shown in Figure 2; the driving element including the rotor assembly which is pressed onto the pentagon shaped end 10a of the main engine crank shaft 37a and the driven element including the housings 3a and 4a which are integral with the propeller shaft 40. Communication between the cylinders 12a and the interior of the crank shaft 37a is permitted through metered ports or passages 13a, as shown to advantage in Figure 4. When used in aircraft engine units, these passages are of such a size that a certain definite speed ratio between the driving element and the driven element is maintained when the control valve 20a is in the extreme open position. This precaution is necessary in order to prevent the engine from operating at any time without a load. The unit is initially filled with liquid through the self-closing valve 32a which, in this instance, is located within the hollow propeller shaft 40 as illustrated. With the device mounted in an oil tight case 41, packing 30 and packing nut 31 could be eliminated, thereby allowing slight leakage of liquid to the case. This leakage would be automatically replaced, through the check valve 36a, from the oil maintained under pressure within the hollow crank shaft 37a by the conventional engine oil pressure pump.

When two or more rotors are employed, as shown in Figure 5, the driving element is composed of the outer housings 3b and 4b and an intermediate housing 42 connected together by the studs 6b. The confronting inner side walls of the housings contain the eccentric tracks 5b in which move the rollers 16b of the pistons 14b of the rotors 8b. When two or more rotors are employed they are so mounted on the pentagon shaped portions 10b of the rotor shaft 9b as to be dynamically balanced and the tracks or races 5b are so placed in the driving member as to maintain the complete assembly in perfect dynamic balance at all times. This may be done by offsetting the eccentric tracks relative to each other so that the high part of one is opposite the low part of the other as will be apparent from the positions of the cylinders shown in Figure 5. The construction of the rotor shaft will be modified as required by the number of rotors used in the assembly. For instance, when two rotors are employed, the rotor shaft 9b will be formed, as shown in Figure 8, with a pair of pentagon shaped portions 10b, for seating the cylinders 14b, and a cylindrical portion 43 between the pentagon shaped portions. Sufficient clearance is provided between the housing 42 and the cylindrical shaft portion 43 to permit free circulation of liquid. The flow of liquid between the two sets of cylinders 14b and the interior of the rotor shaft 9b is controlled by a single slide valve 20b which is provided with a series of slots or ports 44 adapted, during the actuation of the valve, to be placed into and out of registration with the ports 13b of the rotor on the right of Figure 5 to control the passage therethrough, the control of the left hand cylinder being effected by the free end 45 of the slide valve. In other respects, the construction of the two unit assembly is substantially the same as that shown in Figure 1.

The operation of the variable speed hydraulic power transmission device, as described herein, is as follows. With the interior of the device completely filled with oil, as illustrated, and the slide valve in the neutral position as shown in full lines in the several figures, the pistons are free to be reciprocated in the cylinders by the eccentric track since the open ports at the inner ends of the cylinders allow free circulation of the oil from the cylinders to the interior of the assembly. This free circulation of oil relieves all pressure under the pistons or plungers, permitting said pistons or plungers to be freely actuated by means of rollers 16 and 17 which coact, upon relative turning movement of the driving and driven members, with the eccentric track 5 and the guide slots 18. Since each piston moves freely from one limit to the other of its stroke, the turning movement of the driving member is not transmitted to the driven member and the latter idles. As the control valve is moved over the cylinder ports, the oil is partially confined in the cylinders, thereby slowing up the action of the pistons and in doing so changing the speed ratio of the driving element to the driven element. When the cylinder ports are completely closed by the slide valve, as shown by the dotted lines on the Figures 1, 3 and 5, the oil is confined within the cylinders, thereby preventing any piston movement. This, of course, prevents any relative turning movement between the driving and driven elements which are thereby locked together in direct drive. As will be apparent, by suitable control of the amount of port or passage opening any speed ratio from direct drive to neutral may be obtained.

In view of the fact that the device is completely filled with liquid at all times, it is obvious that the bearings and moving parts thereof are constantly lubricated and consequently wear on the parts is practically eliminated. The variation of the rotational speed ratio of driving and driven shafts is effected in a smooth, silent and gradual, though rapid, manner and without the consequent wear and noise incident to the use of the present conventional reduction gear type of speed transmission.

We claim:

1. A variable speed hydraulic transmission assembly having, in combination, an outer rotatable member defining a liquid tight enclosure, an inner rotatable member having an axial liquid reservoir provided with radial ports and cylinders in communication with the said ports, means operable upon the relative rotation of the said members for moving the liquid alternately into and out of said cylinders and for establishing a driving connection between the members when the liquid movement is retarded or prevented, and means for controlling the liquid movement including a tubular valve within the said axial liquid reservoir and slidable therein for covering and uncovering the said ports, and a control collar slidable on the said inner member and connected with the said valve through slots in the walls of the said reservoir.

2. A multi-unit hydraulic speed transmission having, in combination, an outer liquid filled rotatable member provided with a central partition defining separate rotor compartments, a hollow liquid filled rotor shaft journaled in said outer member, rotors mounted on said shaft and operating within the said rotor compartments, each of said rotors having a plurality of cylinders in communication with the liquid filled interior of the rotor shaft, pistons in the cylinders, connections between the pistons and the outer member operable upon relative rotation of the members to cause reciprocation of the pistons, and means for controlling the communication between the cylinders and the interior of the rotor shaft including a single slide valve common to all the cylinders and within the liquid filled interior of the rotor shaft.

3. In a variable speed hydraulic power transmission, a rotor shaft having a liquid-filled axial chamber provided at one end with circumferential ports and at the opposite end with circumferential slots, a slide valve within the liquid-filled axial chamber and movable to cover and uncover the said ports, said valve having an axial passage for the flow of the liquid therethrough, valve-actuating means including a collar slidable on the said shaft and connected with the said valve through the said slots of the shaft, and packing between the valve and the shaft to prevent leakage of liquid into the slotted portion of the shaft.

4. In a variable speed hydraulic power transmission, a rotor shaft having a liquid-filled axial chamber provided at one end with circumferential ports and at the opposite end with circumferential slots, a close fitting tube valve within the liquid-filled axial chamber and slidable to cover and uncover the said ports, said tube valve being of a length to cover to said slots in all positions of the valve, valve-actuating means including a collar slidable on the said shaft and connected with the said valve through the said slots of the shaft, and packing rings on the said tube valve and engaging the shaft to prevent leakage of liquid into the slotted portion of the shaft.

5. A rotatable liquid-filled housing having a liquid inlet on one side thereof, an external liquid reservoir in communication with said inlet, a pressure-responsive valve in the inlet, a rotor shaft journaled in the housing and extending outwardly thereof on the side opposite to the liquid inlet, said shaft having an axial liquid-filled chamber open at its inner end to the interior of the liquid-filled housing, a rotor on the inner end of the shaft having a plurality of radial liquid-passages in communication with the axial chamber of the shaft through radial ports in said shaft, plungers in said passages, connecting means between the casing and the plungers operating during relative motion between the two to reciprocate the plungers for pumping the liquid alternately into and out of the radial passages, a slidable valve in the liquid of the axial chamber of the shaft, and means for reciprocating said valve to cover and uncover the said radial ports.

6. In a variable speed hydraulic power transmission, a rotor shaft having a hollow portion provided with an external polyhedrical shaped rotor seat, each side of which has an axially elongated narrow slot opening outwardly of the hollow interior of the shaft; a rotor seated on said shaft and having a shaft-receiving axial opening shaped to correspond to the rotor seat of the shaft, said rotor also having radially disposed cylindrical bores opening outwardly of the circumference of the rotor in line with the flat sides of the axial opening of the rotor, each cylindrical bore being perpendicular to the corresponding flat side of the rotor seat and communicating at its inner end with the hollow interior of the shaft through the slot in said side of the seat, and a tubular member within the hollow portion of the shaft and slidable for covering and uncovering the said slots.

RALPH E. GREY.
BERNICE L. BOYNTON.
DAVIDSON K. KIRKPATRICK.